United States Patent
Cotten et al.

(10) Patent No.: US 9,453,424 B2
(45) Date of Patent: Sep. 27, 2016

(54) REVERSE BULK FLOW EFFUSION COOLING

(71) Applicant: Siemens Energy, Inc., Orlando, FL (US)

(72) Inventors: Blake R. Cotten, Orlando, FL (US); Richard L. Thackway, Oviedo, FL (US); Charalambos Polyzopoulos, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 465 days.

(21) Appl. No.: 14/058,705

(22) Filed: Oct. 21, 2013

(65) Prior Publication Data

US 2015/0107267 A1    Apr. 23, 2015

(51) Int. Cl.
F01D 9/02 (2006.01)
F23R 3/06 (2006.01)

(52) U.S. Cl.
CPC ............... F01D 9/023 (2013.01); F23R 3/06 (2013.01); F05D 2260/202 (2013.01); F23R 2900/03041 (2013.01); Y02T 50/676 (2013.01)

(58) Field of Classification Search
CPC .... F01D 9/023; F05D 2260/202; F23R 3/06; F23R 2900/03041; Y02T 50/676
See application file for complete search history.

(56) References Cited

U.S. PATENT DOCUMENTS

| | | | | |
|---|---|---|---|---|
| 4,054,028 A * | 10/1977 | Kawaguchi | ............ | F23C 6/045 431/10 |
| 5,169,287 A | 12/1992 | Proctor et al. | | |
| 5,775,108 A * | 7/1998 | Ansart | ............... | F23R 3/06 60/752 |
| 6,655,149 B2 * | 12/2003 | Farmer | ............... | F23R 3/06 60/754 |
| 6,735,949 B1 * | 5/2004 | Haynes | ............... | F23R 3/283 60/746 |
| 7,137,241 B2 * | 11/2006 | Martling | ............... | F01D 9/023 60/39.37 |
| 7,219,498 B2 * | 5/2007 | Hadder | ............... | F23R 3/007 60/752 |
| 7,546,737 B2 * | 6/2009 | Schumacher | ............ | F23R 3/002 60/754 |
| 7,712,314 B1 * | 5/2010 | Barnes | ............... | F23R 3/002 60/755 |
| 8,033,119 B2 * | 10/2011 | Liang | ............... | F01D 9/023 60/752 |
| 2003/0106317 A1 * | 6/2003 | Jorgensen | ............ | F01D 9/023 60/722 |
| 2003/0106318 A1 | 6/2003 | Leahy, Jr. | | |
| 2006/0037323 A1 * | 2/2006 | Reynolds | ............ | F23R 3/06 60/754 |
| 2010/0242485 A1 * | 9/2010 | Davis, Jr. | ............ | F23R 3/002 60/752 |
| 2014/0260273 A1 * | 9/2014 | Melton | ............ | F23R 3/002 60/739 |

FOREIGN PATENT DOCUMENTS

EP    1762705 A1    3/2007

* cited by examiner

*Primary Examiner* — Carlos A Rivera

(57) ABSTRACT

Effusion cooling holes formed through a transition component provided in a combustion section of a gas turbine engine. The transition component directs a hot working gas from a combustion basket to a first row of vanes in a turbine section of the engine. The effusion cooling holes are formed through an outer wall of the transition component in a direction so that the flow of air through the effusion holes is in a direction substantially opposite to the bulk flow direction of the working gas through the transition component.

20 Claims, 3 Drawing Sheets

REVERSE BULK FLOW EFFUSION COOLING

BACKGROUND OF THE INVENTION

1. Field of the Invention

This invention relates generally to effusion cooling holes formed in a transition component that is part of a combustion section in a gas turbine engine and, more particularly, to effusion cooling holes formed in a transition component that is part of a combustion section in a gas turbine engine, where the effusion cooling holes are angled to direct a cooling airflow into the transition component in a direction substantially opposite to a bulk gas flow.

2. Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typically gas turbine engine includes a compressor section, a combustion section and a turbine section. The compressor section provides a compressed airflow to the combustion section where the air is mixed with a fuel, such as natural gas. The combustion section includes a plurality of circumferentially disposed combustors that receive the fuel to be mixed with the air and ignited to generate a working gas. The working gas expands through the turbine section and is directed across rows of blades therein by associated vanes. As the working gas passes through the turbine section, it causes the blades to rotate, which in turn causes a shaft to rotate, thereby providing mechanical work.

The temperature of the working gas is tightly controlled so that it does not exceed some predetermined temperature for a particular turbine engine design because too high of a temperature can damage various parts and components in the turbine section of the engine. However, it is desirable to allow the temperature of the working gas to be as high as possible because the higher the temperature of the working gas, the faster the flow of the gas, which results in a more efficient operation of the engine.

In certain gas engine turbine designs, a portion of the compressed airflow is also used to provide cooling for certain components in the turbine section, such as the vanes, blades and ring segments. The more cooling and/or the more efficient cooling that can be provided to these components allows the components to be maintained at a lower temperature, and thus the higher the temperature the working gas can be. For example, by reducing the temperature of the compressed air, less compressed air is required to maintain the part at the desired temperature, resulting in a higher working gas temperature and a greater power and efficiency from the engine. Further, by using less cooling air at one location in the turbine section, more cooling air can be used at another location in the turbine section. In one known turbine engine design, 80% of the compressed airflow is mixed with the fuel to provide the working gas and 20% of the compressed airflow is used to cool the turbine parts. If less of that cooling air is used at one particular location as a result of the cooling air being lower in temperature, then more cooling air can be used at other areas for increased cooling.

In one known gas turbine engine design, a transition component is provided at an output of a combustor basket in which the combustion occurs in the combustion section that directs the hot working gas to the first row of vanes in the turbine section. Typically, the temperature of the working gas at this location in the gas turbine engine is too high for the material of the transition component and as such the transition component needs to be cooled. In one known gas turbine design, a series of effusion cooling holes are provided in the transition component that receive a portion of the compressed airflow to provide the cooling. The known effusion cooling holes are generally effective in providing the desired cooling. However, with increasing working gas temperatures, increased transition component cooling may be necessary.

SUMMARY OF THE INVENTION

This disclosure describes effusion cooling holes formed through a transition component provided in a combustion section of a gas turbine engine. The transition component directs a hot working gas from a combustor basket to a first row of vanes provided in a turbine section of the engine. The effusion cooling holes are formed through an outer wall of the transition component in a direction so that the flow of air through the effusion holes is in a direction substantially opposite to the bulk flow direction of the working gas through the transition component.

Additional features of the present invention will become apparent from the following description and appended claims, taken in conjunction with the accompanying drawings.

DETAILED DESCRIPTION OF THE EMBODIMENTS

The following discussion of the embodiments of the invention directed to effusion cooling holes provided in a transition component in a combustion section of a gas turbine engine is merely exemplary in nature, and is in no way intended to limit the invention or its applications or uses.

Figure 1:
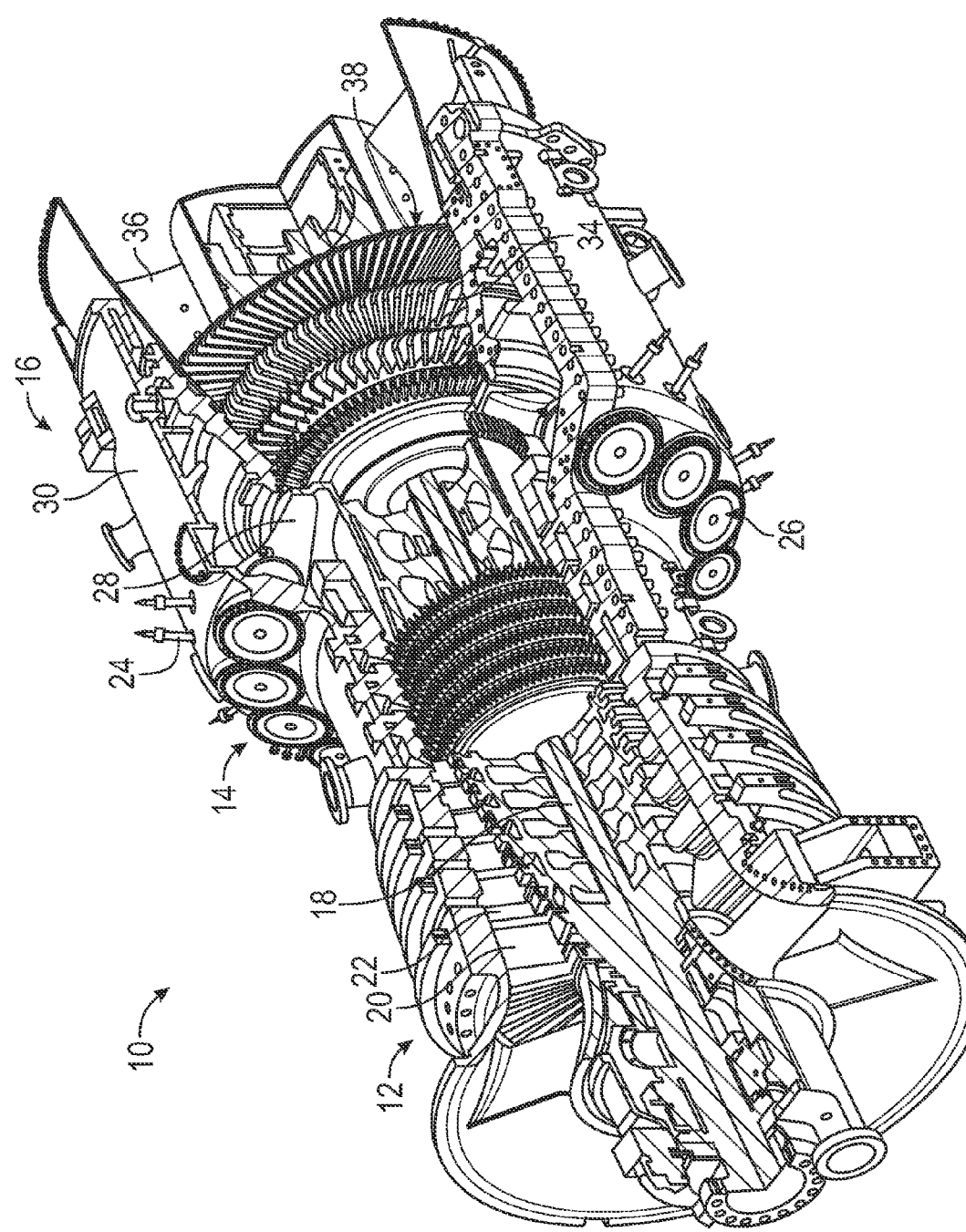
FIG. 1 is a cut-away, isometric view of a gas turbine engine.

FIG. 1 is a cut-away, isometric view of a gas turbine engine 10 including a compressor section 12, a combustion section 14 and a turbine section 16 all enclosed within an outer housing or casing 30, where operation of the engine 10 causes a central shaft or rotor 18 to rotate, thus creating mechanical work. The engine 10 is illustrated and described by way of a non-limiting example to provide context to the invention discussed below. Those skilled in the art will appreciate that other gas turbine engine designs can also be used in connection with the invention. Rotation of the rotor 18 draws air into the compressor section 12 where it is directed by vanes 22 and compressed by rotating blades 20 to be delivered to the combustion section 14, where the compressed air is mixed with a fuel, such as natural gas, and where the fuel/air mixture is ignited to create a hot working gas. More specifically, the combustion section 14 includes a number of circumferentially disposed combustors 26 each receiving the fuel that is injected into the combustor 26 by an injector (not shown), mixed with the compressed air and ignited by an igniter 24 to be combusted to create the working gas, which is directed by a transition component 28 into the turbine section 16. The working gas is then directed by circumferentially disposed stationary vanes (not shown in FIG. 1) in the turbine section 16 to flow across circumferentially disposed rotatable turbine blades 34, which causes the turbine blades 34 to rotate, thus rotating the rotor 18. Once the working gas passes through the turbine section 16 it is output from the engine 10 as an exhaust gas through an output nozzle 36.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receive the highest temperature of the working gas, where the temperature of the working gas decreases as it flows through the turbine section 16.

Figure 2:
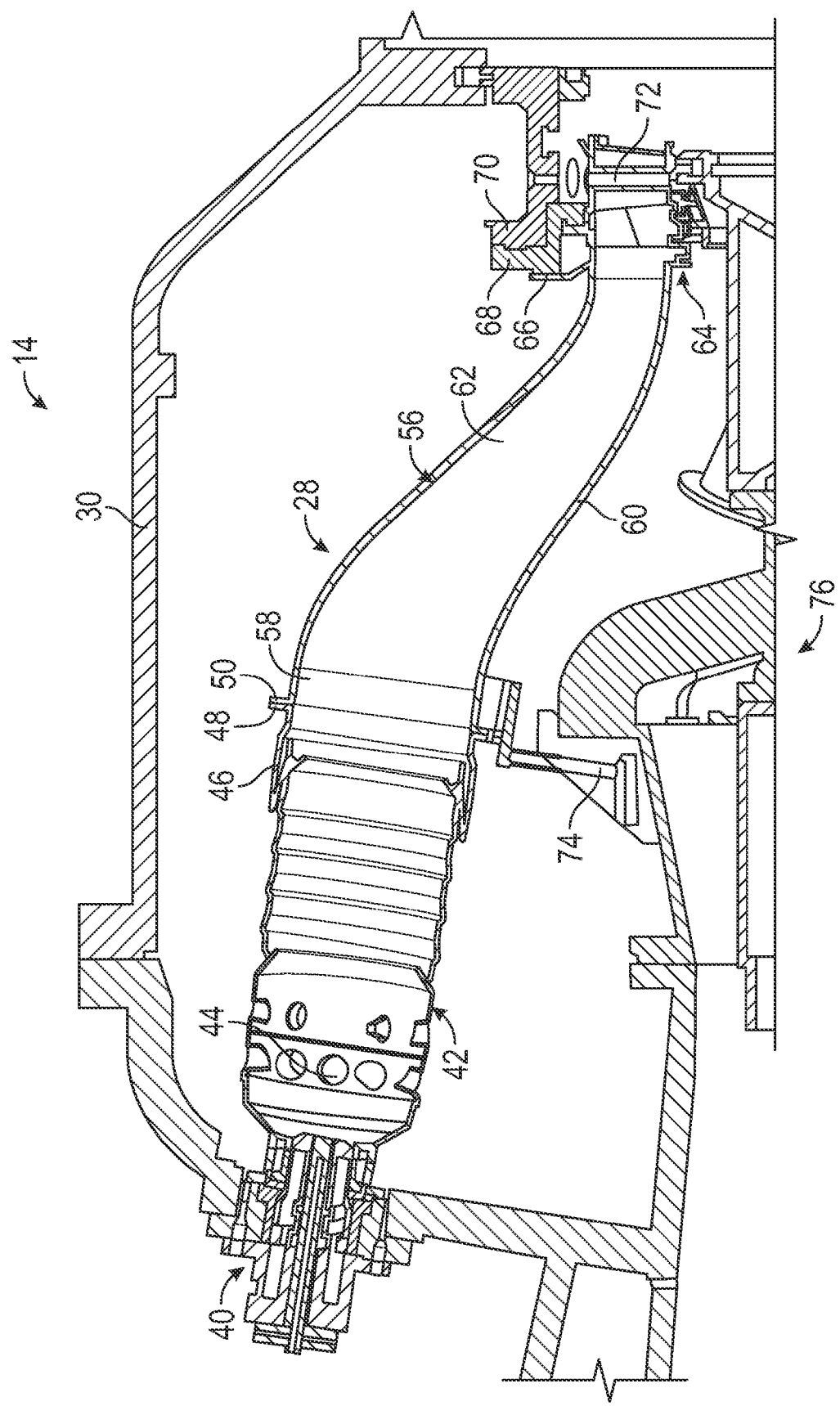
FIG. 2 is a cut-away cross-sectional type view of a portion of a combustion section for a gas turbine engine.
Figure 3:
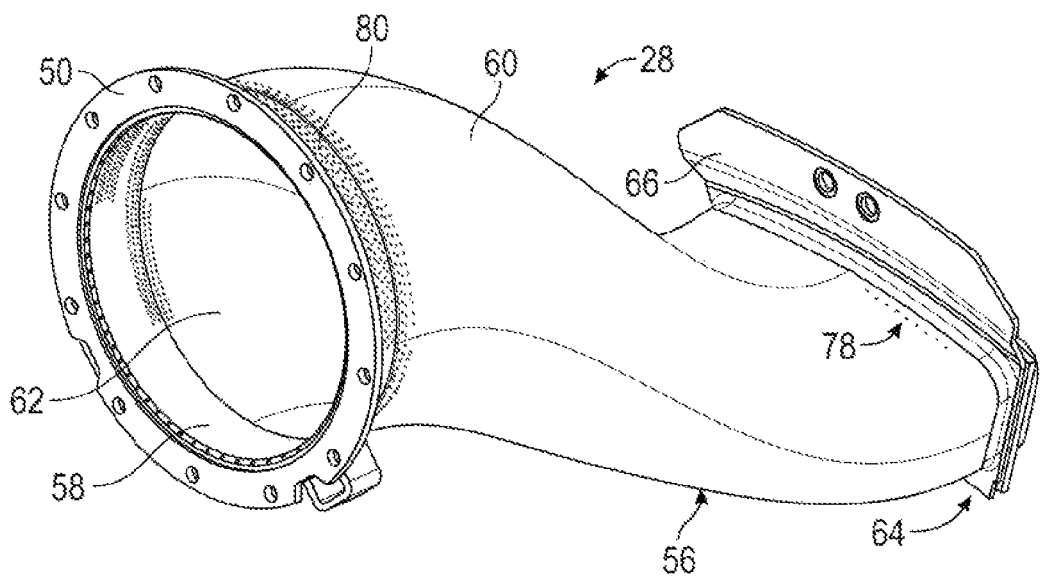
FIG. 3 is an isometric view of a transition component separated from the combustion section shown in FIG. 2.

FIG. 2 is a cut-away, cross-sectional type view of a portion of the combustion section of a gas turbine engine having a similar design to the gas turbine engine 10 and showing one of the combustors 26 and one of the transition components 28. FIG. 3 is an isometric view of the transition component 28 separated from the combustion section 14. The combustor 26 includes a nozzle section 40 through which the fuel is injected into a cylindrical combustor basket 42 in a manner well understood by those skilled in the art. Air from the compressor section 12 enters the combustor basket 42 through circumferentially disposed openings 44, where the air/fuel mixture is ignited by the igniters 24 to generate the hot working gas that flows towards an output end 46 of the basket 42 opposite to the nozzle 40. The transition component 28 includes an annular flange 50 at an input end that is mounted to an annular flange 48 at the output end 46 of the basket 42. The transition component 28 also includes a curved transition section 56 extending from the flange 50 that includes an inlet ring portion 58 and an outer wall 60 defining an internal chamber 62, where the transition section 56 includes an upper panel and a lower panel. An end of the transition section 56 opposite to the flange 50 includes an output structure 64 having a mounting flange 66 through which the working gas is output to the turbine section 16. The transition section 56 transitions from a circular opening at the input end of the component 28 to a rectangular opening at the output end of the component 28. The mounting flange 66 is mounted to a ring bracket 68 that is secured to a blade ring 70, all well known to those skilled in the art. The output structure 64 of the transition section 56 is positioned adjacent to row 1 vanes 72 that receive and direct the hot gas to the row 1 blades. A mounting bracket 74 is mounted to the outer wall 60, as shown, and to a compressor exit diffuser 76.

As discussed above, it is necessary to provide cooling air to many of the components in the combustor section 14 and the turbine section 16 of the gas turbine engine 10. One of those components that requires cooling is the transition component 28 as it receives the hottest temperature of the working gas right after combustion. It is known to provide a configuration of spaced apart effusion cooling holes through the transition component 28 that allow pressurized air from the compressor section 12 provided within the casing 30 to flow therethrough and into the chamber 62 to ultimately be mixed with the working gas, but providing the necessary cooling to the wall 60 of the transition component 28. In one known gas turbine engine design, the effusion cooling holes extend through the wall 60 of the transition section 56 at an angle so that the cooling air enters the chamber 62 and flows in a direction that is with the bulk flow of the working gas flowing through the chamber 62 from the combustor basket 42 to the first row of the vanes 72. By providing the holes on an angle, the holes are longer and thus provide greater wall cooling. It was believed that this angle of the effusion cooling holes also prevents the hot working gas from flowing through the holes and into the casing 30.

Figure 4:
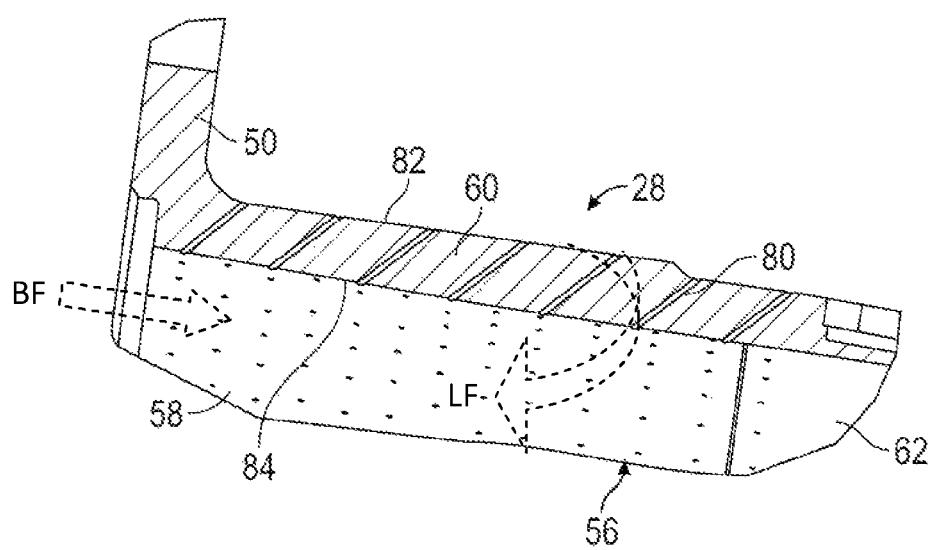
FIG. 4 is a cut-away, cross-sectional view of a portion of the transition component shown in FIG. 3.

It has been discovered that there is a localized recirculation flow (FIG. 4, LF) of the hot working gas at some locations along the inside surface of the wall 60 that is caused by the exit port at the end 46 of the basket 42, where the recirculation flow is opposite to the bulk flow (FIG. 4, BF). This localized recirculation flow is also in a direction substantially opposite to the flow of the cooling air entering the chamber 62 through the forward angled effusion cooling holes that flows with the bulk flow direction in the known effusion cooling hole design. The flow interaction of the local recirculation flow and the bulk flow causes the cooling air from the effusion holes to change direction, which causes the cooling air to be pulled away from the inside surface of the wall 60. This interaction reduces the cooling effectiveness and raises the transition metal temperature.

The present invention proposes reversing the angle of at least some of the known effusion cooling holes so that the cooling air flows into the chamber 62 in a direction substantially opposite to the bulk flow, but in substantially the same direction as the localized recirculation flow at those locations where the recirculation flow id occurring. In one non-limiting embodiment, the angle of the effusion cooling holes that are configured and angled in an opposite direction to the bulk flow are only provided in and around the inlet ring portion 58 and just downstream therefrom because that is the area where most of the localized recirculation flow occurs as a result of the bulk flow from the basket 42 into the transition component 28. Therefore, although spaced apart effusion cooling holes may be provided at other locations in the transition section 56, most of those effusion cooling holes that are downstream of the inlet ring portion 58, represented generally as effusion cooling holes 78, are angled in the traditional direction where the cooling flow is in a direction with the bulk flow because the recirculation flow in this area is negligible.

FIG. 4 is a cut-away, cross-sectional view of a portion of the transition component 28 including effusion cooling holes 80 angled in this opposite direction and being provided within and around the inlet ring portion 58 as mentioned. Particularly, the wall 60 includes an outside surface 82 and an inside surface 84, where an opening of the effusion cooling holes 80 at the inside surface 84 is farther upstream, i.e., closer to the flange 50, than the opening of the effusion cooling holes 80 at the outside surface 82. Pressurized air in the casing 30 enters the effusion holes 80 and flows into the chamber 62. By providing the cooling airflow into the chamber 62 in substantially the same direction as the recirculation flow, the cooling air mixes with the recirculation flow in a less turbulent manner, which provides a better film of cooling air close to and along the inside surface 84 of the wall 60, which increases the cooling effectiveness. Further, the recirculation flow prevents the hot working gas from flowing into the effusion cooling holes 80 and into the casing 30.

In the non-limiting embodiment shown, the effusion cooling holes 80 are angled at about 45° through the wall 60, where the effusion cooling holes 80 extend through the outer wall 60 in a direction so that an end of the effusion cooling holes at the inside surface 84 is farther upstream relative to the working gas flow than an end of the effusion cooling holes 80 at the outside surface 82. However, although this angle may provide a desired angle for manufacturing purposes, any suitable acute angle can be employed, where longer effusion holes are generally more desirable. It is noted that the diameter of the effusion cooling holes 80, the spacing of the effusion cooling holes 80, the angle of the effusion cooling holes 80 through the wall 60, the number of the effusion cooling holes 80, etc. are all design specific for a particular gas turbine engine to provide the level of desired cooling. The effusion cooling holes 80 are shown as being configured in rows. However, those skilled in the art will recognize that other configurations may be applicable. Different design criteria may be more important in different gas turbine engines, where it may be desirable to provide less of the cooling air to the transition component 28 to provide the same amount of cooling, or it may be desirable to provide better and more efficient cooling to the transition component 28 so as to allow the temperature of the working gas to be increased.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A transition component for a gas turbine engine, said gas turbine engine including at least one combustor basket in which a gas/fuel mixture is combusted to generate a hot working fluid, said transition component comprising a first end mounted to the combustor basket and receiving the hot working fluid, a second end opposite to the first end outputting the hot working fluid, and a transition section between the first end and the second end having an outer wall defining a chamber therein through which the hot working fluid flows, said outer wall having an inside surface and an outside surface, the inside and outside surfaces being substantially parallel with a direction of a bulk flow, said transition section including a plurality of first effusion cooling holes extending through the outer wall and being angled in a direction so that an end of the effusion cooling holes at the inside surface is farther upstream relative to the hot working fluid than an end of the effusion cooling holes at the outside surface.

2. The transition component according to claim 1 wherein the plurality of first effusion cooling holes are angled at an acute angle.

3. The transition component according to claim 2 wherein the plurality of first effusion cooling holes are angled at about a 45° in the outer wall.

4. The transition component according to claim 1 wherein the first end of the transition component includes a general circular shape and the second end of the transition component includes a general rectangular shape.

5. The transition component according to claim 1 wherein the plurality of first effusion cooling holes are proximate to an inlet ring of the transition section provided at the first end of the transition component.

6. The transition component according to claim 5 wherein the plurality of first effusion cooling holes are provided in the inlet ring.

7. The transition component according to claim 1 wherein the second end of the transition component includes a mounting flange configured to be mounted to a blade ring in a turbine section of the gas turbine engine.

8. The transition component according to claim 1 wherein the second end of the transition component is configured to provide the hot working fluid to a row of vanes in a turbine section of the gas turbine engine.

9. The transition component according to claim 1 wherein the plurality of first effusion cooling holes receive a pressurized cooling airflow provided by a compressor section of the gas turbine engine.

10. The transition component according to claim 1 wherein the transition component is one of a plurality of transition components circumferentially disposed in a combustor section of the gas turbine engine.

11. A transition duct for mounting to a combustor basket of a turbomachine, the transition duct comprising:
a first end adapted to mount to the combustor basket and for receiving a bulk flow of a hot working fluid,
a second end opposite to the first end outputting the hot working fluid, and a transition section between the first end and the second end having an outer wall having an inner and outer surface being substantially parallel between the first and second end with a direction of the bulk flow and defining a chamber therein through which the hot working fluid flows, said transition section including a plurality of effusion cooling holes extending through the outer wall and being angled in a direction so that cooling air flowing through the effusion cooling holes enters the chamber in a direction substantially opposite to the bulk flow of the hot working fluid and in a direction substantially with a localize recirculation flow.

12. The transition duct according to claim 11 wherein the plurality of effusion cooling holes are angled at an acute angle.

13. The transition duct according to claim 11 wherein the first end of the transition duct includes a general circular shape and the second end of the transition duct includes a general rectangular shape.

14. The transition duct according to claim 11 wherein the plurality of effusion cooling holes are provided proximate to an inlet ring of the transition section provided at the first end of the transition component.

15. A gas turbine comprising:
a shaft rotatably provided along a center line of the gas turbine;
a compressor section responsive to a working fluid and being operable to compress the working fluid to produce a compressed working fluid; a combustion section in fluid communication with the compressor section that receives the compressed working fluid, said combustion section including a plurality of combustors that mix the compressed working fluid with a fuel and combust the compressed fluid and fuel mixture to produce a hot working fluid, each combustor including a combustor basket in which the combustion occurs, said combustion section further including a transition component for each combustor, each transition component including a first end mounted to the combustor basket and receiving the hot working fluid, a second end opposite to the first end outputting the hot working fluid, a transition section between the first end and the second end having an outer wall defining a chamber therein through which the hot working fluid flows, said outer wall having an inside surface and an outside surface, the inside and outside surface being substantially parallel with a direction of a bulk flow, said transition section including a plurality of effusion cooling holes extending through the outer wall and being angled in a direction so that an end of the effusion cooling holes at the inside surface is farther upstream relative to the hot working fluid than an end of the effusion cooling holes at the outside surface; and a turbine section in fluid communication with the combustion section, said turbine section expanding the hot working fluid to produce mechanical power through rotation of the shaft.

16. The gas turbine according to claim 15 wherein the plurality of first effusion cooling holes are angled at an acute angle.

17. The gas turbine according to claim 15 wherein the first end of the transition component includes a general circular shape and the second end of the transition component includes a general rectangular shape.

18. The gas turbine according to claim 15 wherein the second end of the transition component includes a mounting flange configured to be mounted to a blade ring in the gas turbine section.

19. The gas turbine according to claim 15 wherein the second end of the transition component is configured to provide the hot working fluid to a row of vanes in the gas turbine section.

20. The gas turbine according to claim 15 wherein the effusion cooling holes receive a pressurized cooling airflow provided by the compressor section.

* * * * *